US006964060B2

(12) United States Patent
Kamperman et al.

(10) Patent No.: US 6,964,060 B2
(45) Date of Patent: Nov. 8, 2005

(54) CONDITIONAL ACCESS SYSTEM FOR CONTROLLING THE ACCESS TO A DATA CONTENT

(75) Inventors: Franciscus Lucas Antonius Johannes Kamperman, Eindhoven (NL); Bartholomeus Johannes Van Rijnsoever, Eindhoven (NL); Mathieu Petrus Franciscus Maria Goudsmits, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 899 days.

(21) Appl. No.: 09/741,916

(22) Filed: Dec. 20, 2000

(65) Prior Publication Data

US 2001/0014970 A1    Aug. 16, 2001

(51) Int. Cl.$^7$ ............................................. H04N 7/167
(52) U.S. Cl. ........................................................ 725/31
(58) Field of Search ........................ 380/202, 211, 231, 380/239; 725/25, 31

(56) References Cited

U.S. PATENT DOCUMENTS

| 6,005,938 | A | * | 12/1999 | Banker et al. ............... 380/239 |
| 6,057,872 | A | * | 5/2000 | Candelore ..................... 725/23 |
| 6,157,719 | A | * | 12/2000 | Wasilewski et al. ........ 380/210 |
| 6,697,489 | B1 | * | 2/2004 | Candelore ................... 380/200 |
| 2002/0170053 | A1 | * | 11/2002 | Peterka et al. ................. 725/31 |

FOREIGN PATENT DOCUMENTS

| EP | 0128555 A2 | | 12/1984 | ............ H04N 7/16 |
| WO | WO 9843426 A1 | * | 10/1998 | ............ H04N 7/16 |
| WO | WO 200152543 A1 | * | 7/2001 | ............ H04N 7/167 |

OTHER PUBLICATIONS

Coutrot et al., "A Single Conditional Access System for Satellite-Cable and Terrestrial TV", IEEE Transactions on Consumer Electronics, vol. 35, No. 3, Aug. 1998, pp. 464-468.

* cited by examiner

Primary Examiner—John Miller
Assistant Examiner—Scott Beliveau

(57) ABSTRACT

A conditional access system for controlling the access of receivers of end-users to data transmitted from a data content source in an uplink system. The uplink system comprises a scrambler for scrambling the content supplied from the content source, an entitlement control message generator for generating entitlement control messages containing a control word and an entitlement identification, and a transmitter for transmitting the scrambled content and the entitlement control messages. A descrambler, an entitlement control message decoder and means for storing entitlements are associated to the receiver. The entitlement control message decoder supplies a control word to the descrambler for descrambling a part of the received scrambled content for which the receiver is entitled, if a match between the entitlement identification in the entitlement control message and the entitlement of the end-user exists. The receiver side is provided with means for receiving and storing a meta-entitlement of the end-user, said meta-entitlement including an event number range, and means for extracting from the meta-entitlement an actual entitlement identification including the event selected by the end-user. A control word from the entitlement control message is supplied to the descrambler if the entitlement identification in the entitlement control message matches the actual entitlement.

11 Claims, 1 Drawing Sheet

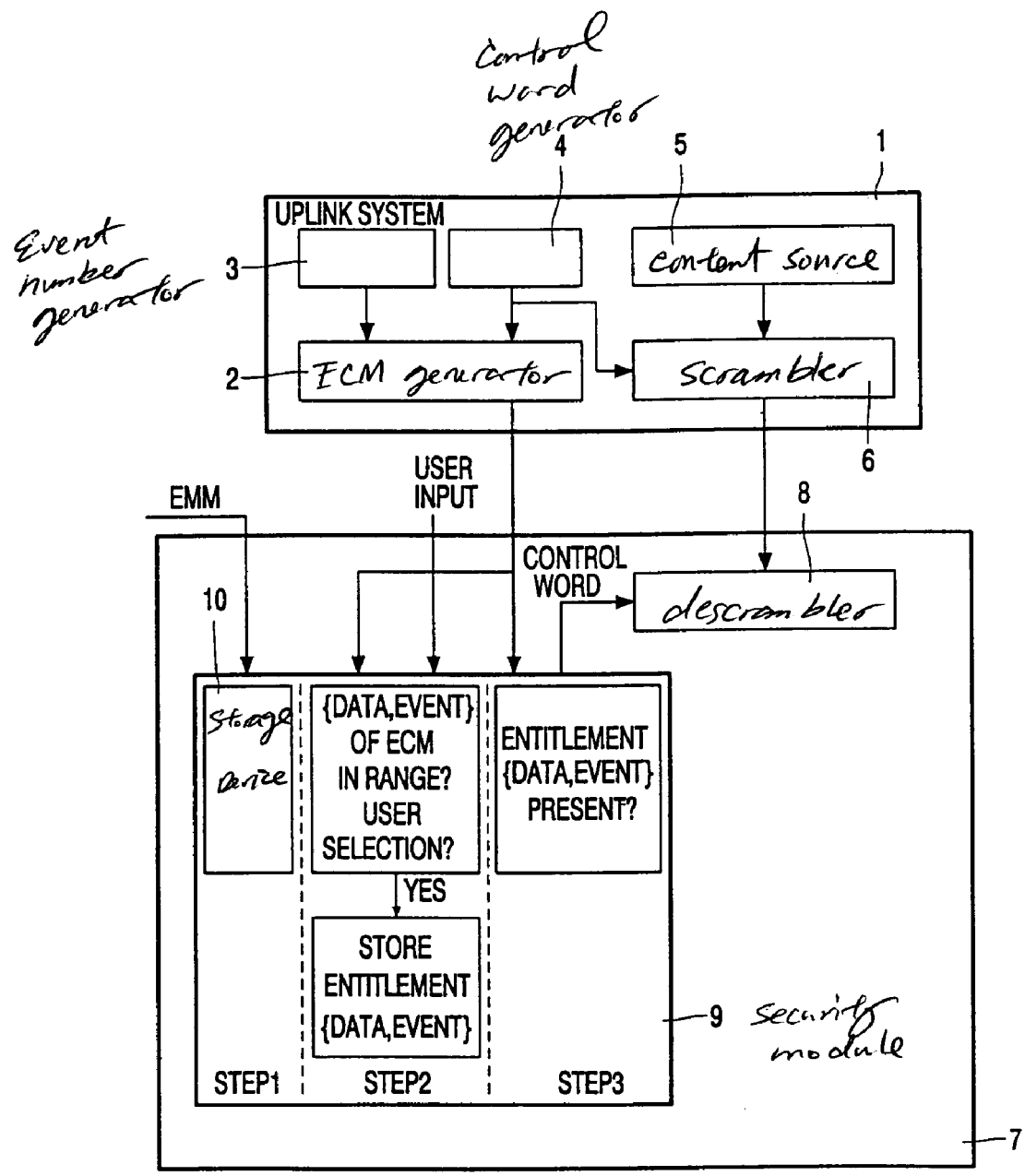

CONDITIONAL ACCESS SYSTEM FOR CONTROLLING THE ACCESS TO A DATA CONTENT

The invention relates to a conditional access system for controlling the access of receivers of end-users to data transmitted from a data content source in an uplink system, said uplink system comprising a scrambler for scrambling the content supplied from the content source, an entitlement control message generator for generating entitlement control messages containing a control word and an entitlement identification and a transmitter for transmitting the scrambled content and the entitlement control messages, in which access system a descrambler, an entitlement control message decoder and means for recording entitlements are associated to the receiver, and in which access system, if a match between the entitlement identification in the entitlement control message and the stored entitlement exists, the entitlement control message decoder supplies a control word to the descrambler for descrambling a part of the received scrambled content for which the receiver is entitled.

Such a conditional access system is known from the article "A single conditional access system for satellite-cable and terrestrial TV" published in IEEE Transactions on Consumer Electronics, Vol. 35, No. 3, August 1989, pages 464–468.

Current conditional access systems provide for the following entitlements to give access to services:
  subscription (which entitlement gives access to a service);
  pay-per-view (which entitlement gives access to an event);
  impulse-pay-per-view (locally generated pay-per-view entitlement); and
  pay-per-time (giving access to a service).

Subscription and pay-per-view are so-called prebooked entitlements. The subscriber needs to contact the service provider, normally by telephone, for obtaining such an entitlement. The subscriber can be billed in advance or later. This may of course depend on the expected solvability of the subscriber and on the presence of good communication lines, i.e. mail and telephone.

Impulse pay-per-view is a locally generated entitlement. It enables the subscriber to make last minute choices without contacting the service provider. However, choices will be reported back automatically to the service provider later, normally by telephone. The subscriber will be billed and this requires the presence of telephone line and the expectation that the subscriber will pay.

In a pay-per-time scenario the subscriber pays for the time he or she consumes a service. The amount of time watched will be reported back automatically to the service provider later, normally by telephone. The subscriber could be billed later. This requires also the presence of a telephone line and the expectation that the subscriber will pay.

From the description above it follows that choosing events by the user is (now) in fact only possible if a telephone line is available. In the absence of a telephone line, immediate user influence is hardly possible.

The invention has the object to provide a conditional access system of the above-mentioned kind, in which more user influence is allowed.

This object is achieved by the invention in that the receiver side is provided with means for receiving and storing a meta-entitlement of the end-user, said meta-entitlement including an event number range, and means for extracting from the meta-entitlement an actual entitlement identification including the event selected by the end-user, after which a control word from the entitlement control message is supplied to the descrambler if the entitlement identification in the entitlement control message matches the actual entitlement.

According to the invention prebooked entitlements, called meta-entitlements are defined, which indicate a range of events from which a user is allowed to make one or more selections. Such an entitlement must be sent to the user in advance, but the user may decide up to the last moment if he uses (part of) the entitlement for some event or not. This provides for immediate user influence on the entitlements obtained without needing a return channel. This functionality could be called "event-out-of-range-selection".

The main advantages of the invention are:
  providing a choice between a given number of events
  payment in advance
  there is no need to report afterwards (like in case of IPPV).

The invention will be explained further by reference to the enclosed FIGURE showing the architecture of a preferred embodiment of a conditional access system according to the invention.

In general, in conditional access systems one could distinguish among others a service and an event.

A service is a sequence of programs under the control of a broadcaster which can be broadcasted as part of a schedule. The service is the central referenced entity.

An event is a grouping of elementary broadcast data streams with a defined start and end time belonging to a common service, e.g. first half of a football match, News Flash, first part of an entertainment show. An event is always part of one and only one service, i.e. one event cannot be part of multiple services.

According to the invention a so-called meta-entitlement is defined, which includes among others a set of events, from which set events could be selected by the user. This entitlement is transmitted to and stored at the user. Entitlement control messages are also transmitted to the user, including event identifications. At the user side means are provided for extracting the actual entitlement from the meta-entitlement if allowed and decided by the user. This actual entitlement then gives access to the event selected. By means of the actual entitlement a control word is extracted from the entitlement control message and supplied to the descrambler at the user-end, so that the scrambled event can be descrambled and is accessible for the user.

The abovementioned type of conditional access could be implemented in a prior art conditional access system, which implementation is described hereafter.

Prior art conditional access systems use entitlement control messages for controlling the access to an offered content item and entitlement management messages for storing the bought entitlements at the end-user.

In conditional access systems several entitlements exist.

A subscription entitlement gives access to a (range of) service(s), while a pay-per-view (PPV) entitlement gives access to a (range of) specific program(s) in a service. A PPV-entitlement could be considered as a limited subscription entitlement.

As shown in the FIGURE the uplink system 1 of the conditional access system comprises an ECM generator 2 to the inputs of which an event number generator 3 and a control word generator 4 are connected. The uplink system 1 further comprises a content source 5, of which the output is connected to a scrambler 6.

At the end-user location a receiver 7 is provided, which comprises a descrambler 8. Furthermore, at the end-user location a security module 9 is provided.

The security module 9 comprises a means 10 for storing a meta-entitlement. Said meta-entitlement includes a set of events, from which set the user may make a selection of events. Preferably a meta-entitlement is transmitted through an entitlement management message (EMM).

In an embodiment of the invention the meta-entitlement includes the number of selections field, which indicate how many events the user is allowed to select and the set of dates field, indicating between what dates the user is allowed to make selections.

An example of a meta-entitlement is:
<service-nr>
<selection counter>
<begin-programme-nr-end-event-nr>
<begin-date-end-date>

This meta-entitlement is transmitted through an EMM and subsequently stored on a security module. The meta-entitlement does not entitle decryption of ECM's, but is used to derive an actual entitlement.

Suppose the user wants to access a program with following ECM's:
<service-nr>
<event-nr>
<current-date>

The user is entitled to select the program if <service-nr> is equal, and <programme-nr> and <current-date> are in the range as indicated by the meta-entitlement. The smart card will generate the real entitlement from the meta-entitlement and ECM if the user decides to select the program. This entitlement allows decryption of the corresponding ECM and has the following syntax:
<service-nr>
<programme-nr>
<current-date>

To control the number of selections we introduce the <selection-counter> object in meta-entitlements. It indicates the number of selections still allowed and is updated after each selection. If the user selects a programme the <selection counter> will be decreased by one. If it becomes zero no selections are allowed anymore.

The FIGURE should be read from the left-hand bottom corner to the right-hand upper corner. It visualises the three main steps in the mechanism from sending a meta-entitlement to the scrambling event. In the first step the user obtains a prebooked meta-entitlement which indicates from which events he or she may choose. If the user tunes to such an event he or she may indicate if he or she desires an entitlement for that event through the user input. If yes, the security module extracts the actual entitlement from a meta-entitlement and stores it in the second step. Due to this entitlement the security module will decrypt the control words in the ECM required to descramble the event. This is step 3.

Preferably the ECM's and EMM's are cryptographically protected.

What is claimed is:

1. A method for conditional access, comprising:
   receiving and storing a meta-entitlement of an end-user, said meta-entitlement including an event number range;
   extracting, from the meta-entitlement, an actual entitlement identification including the event selected by the-end-user;
   determining whether the entitlement identification in the entitlement control message matches the actual entitlement; and
   if a match is determined, supplying a control word from the entitlement control message for use in descrambling received scrambled content.

2. A receiver for use with a conditional access system, the receiver comprising a descrambler, an entitlement control message decoder and means for storing entitlements, wherein means for receiving and storing a meta-entitlement of an end-user, said meta-entitlement including an event number range, and further means for extracting from the meta-entitlement an actual entitlement identification including the event selected by the-end-user, after which a control word from the entitlement control message is supplied to the descrambler if the entitlement identification in the entitlement control message matches the actual entitlement.

3. The receiver of claim 2, wherein the extracting means performs the extracting if allowed and decided by a user.

4. The receiver of claim 2, wherein the meta-entitlement does not entitle decryption of entitlement control messages (ECMs), but is used to derive the actual entitlement.

5. The receiver of claim 2, wherein the range is delimited by a beginning event number and an ending event number that define the events from which the user can select.

6. A conditional access system for controlling the access of receivers of end-users to data transmitted from a data content source comprising:
   an uplink system, said uplink system including a scrambler for scrambling the content supplied from the content source, an entitlement control message generator for generating entitlement control messages containing a control word and an entitlement identification, and a transmitter for transmitting the scrambled content and the entitlement control messages; and
   a receiver including a descrambler, an entitlement control message decoder and means for storing entitlements wherein if a match exists between the entitlement identification in the entitlement control message and the entitlement of an end-user receiver, the entitlement control message decoder supplies a control word to the descrambler for descrambling a part of the received scrambled content for which the receiver is entitled, wherein the receiver stores a meta-entitlement of the end-user, said meta-entitlement including an event number range, and extracts from the meta-entitlement an actual entitlement identification including the event selected by the end-user, after which a control word from the entitlement control message is supplied to the descrambler if the entitlement identification in the entitlement control message matches the actual entitlement.

7. The conditional access system according to claim 6, in which the uplink system comprises a generator and a transmitter for generating and transmitting an entitlement management message, wherein the meta-entitlement is transmitted in an entitlement management message to the entitled receiver.

8. The conditional access system according to claim 6, wherein the actual entitlement is extracted from both the meta-entitlement and the entitlement control message.

9. The conditional access system according to claim 1, wherein the meta-entitlement includes a date range.

10. The conditional access system according to claim 6, wherein the meta-entitlement includes a number of allowed selections.

11. The conditional access system according to claim 6, wherein at the receiver side a selection counter is provided, which is set to the number of allowed selections in the meta-entitlement in the entitlement management message upon reception of said message and is decremented by each event selection by the end-user.

* * * * *